United States Patent [19]

Dirkse et al.

[11] Patent Number: 4,809,886
[45] Date of Patent: Mar. 7, 1989

[54] APPARATUS FOR CONTROLLING A FLOW OF GRANULAR MATERIAL

[75] Inventors: Hendrik A. Dirkse; Wiecher D. E. Steenge; Andrew M. Scott, all of Amsterdam, Netherlands

[73] Assignee: Shell Oil Company, Houston, Tex.

[21] Appl. No.: 78,953

[22] Filed: Jul. 29, 1987

[30] Foreign Application Priority Data

Sep. 16, 1986 [GB] United Kingdom ............... 8622251

[51] Int. Cl.$^4$ ............................................. B65G 69/06
[52] U.S. Cl. ....................................... 222/195; 34/167
[58] Field of Search ............... 222/195, 460, 564, 559, 222/565, 630

[56] References Cited

U.S. PATENT DOCUMENTS

| 1,029,273 | 6/1912 | Butler | 222/195 |
|---|---|---|---|
| 2,386,670 | 10/1945 | Evans | 34/167 |
| 2,656,007 | 10/1953 | Arnold et al. | 34/167 |
| 3,097,828 | 7/1963 | Grun | 222/195 |
| 3,793,742 | 2/1974 | Rainville et al. | 222/195 |
| 4,061,246 | 12/1977 | Miksitz | 222/195 |
| 4,138,020 | 2/1979 | Steiner et al. | 222/564 |

FOREIGN PATENT DOCUMENTS

| 96013 | 3/1960 | Norway | 222/195 |
|---|---|---|---|
| 999106 | 7/1965 | Switzerland . | |
| 853659 | 11/1960 | United Kingdom . | |
| 1152081 | 5/1969 | United Kingdom . | |
| 1163677 | 9/1969 | United Kingdom . | |
| 1195202 | 6/1970 | United Kingdom . | |
| 1210740 | 10/1970 | United Kingdom . | |
| 2083009A | 3/1982 | United Kingdom . | |
| 2174372A | 11/1986 | United Kingdom . | |

Primary Examiner—F. J. Bartuska
Assistant Examiner—Kenneth Noland

[57] ABSTRACT

Apparatus for controlling a flow of granular material wherein a first member has a first conical side wall and a second member has a second conical side wall arranged adjacent to the first conical side wall so that a passage is defined between the wall of the adjacent side walls, wherein at least the second conical side wall of the second member is provided with a device for introducing aeration agent into the passage.

1 Claim, 3 Drawing Sheets

APPARATUS FOR CONTROLLING A FLOW OF GRANULAR MATERIAL

BACKGROUND OF THE INVENTION

The present invention relates to an apparatus for controlling a flow of granular material, such as shale particles, hot spent shale particles, coal particles, fly ash, or catalyst particles, out of an outlet such as an outlet of a container or a reaction vessel of a catalytic unit, for example a catalytic cracking unit, or through a conduit.

It is an object of the present invention to provide a simple and cheap apparatus which is suitable for controlling the flow out of a large outlet having for example a diameter larger than 0.1 m and suitably larger than 0.5 m, or through a conduit having such a large diameter.

SUMMARY OF THE INVENTION

To this end the apparatus for controlling a flow of granular material according to the invention comprises at least one first member having at least one inclined side wall, and at least one second member arranged next to a first member having at least one inclined side wall, wherein each inclined side wall of a second member is adjacent to an inclined side wall of a first member so that a passage is defined between the adjacent inclined side walls, and wherein at least the inclined side wall(s) of the first member(s) or the inclined side wall(s) of the second member(s) is (are) provided with means for introducing aeration agent into the passage(s).

The flow of granular material is controlled by introducing aeration agent into the passages at a predetermined rate.

An advantage of the apparatus according to the invention is that it does not contain moving parts in the passage through which the granular material flows.

Suitable aeration agents are steam, nitrogen, or synthesis gas.

BRIEF DESCRIPTION OF THE DRAWINGS

The invention will now be described by way of example with reference to the drawings, wherein.

DESCRIPTION OF PREFERRED EMBODIMENTS

Figure 1:
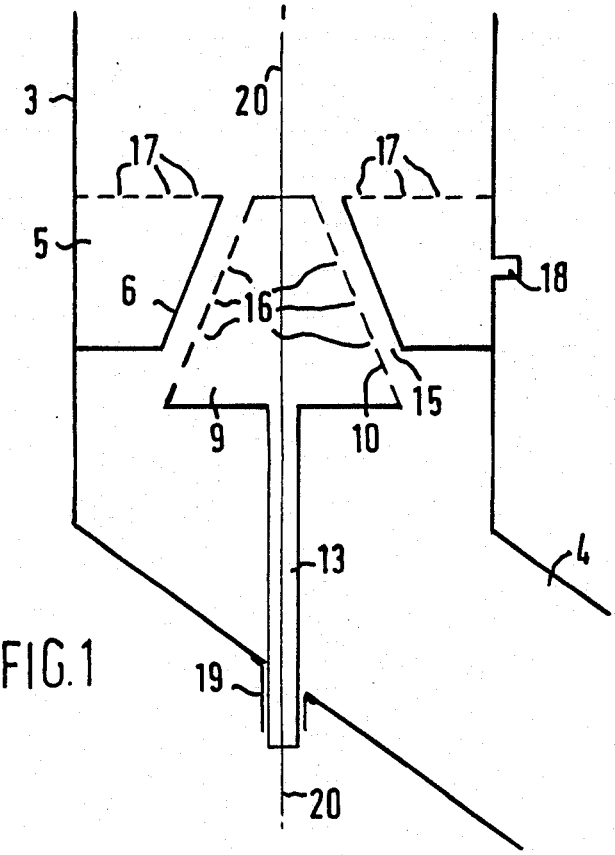
FIG. 1 shows schematically a first embodiment of the invention.

Reference is first made to FIG. 1 showing the outlet 3 of a container for granular material having a discharge conduit 4. The apparatus for controlling a flow of granular material out of the container comprises a first member in the form of annular hollow body 5 which is connected to the wall of the outlet 3 and has an inclined side wall in the form of conical wall 6, and a second member in the form of conical hollow body 9 having an inclined side wall in the form of conical wall 10, wherein the conical hollow body 9, supported by support tube 13, is arranged near the annular hollow body 5.

The conical wall 10 of the conical hollow body 9 is adjacent to the conical wall 6 of the annular hollow body 5 so that a passage 15 is formed between the adjacent conical walls 6 and 10. The conical wall 10 is provided with means for introducing aeration agent in the passage 15 in the form of a plurality of openings 16. For the sake of clarity not all openings have been indicated with reference numerals.

During normal operation the container is filled with granular material, and aeration agent supplied to the support tube 13 is introduced in the passage 15 through the openings 16. The aeration agent will reduce the bulk density of material in the pasasge 15, and thus unobstructed flow of granular material through the passage 15 is allowed.

It has been found that increasing the aeration agent flow rate will increase the mass flow rate of granular material through the passage 15. So that by adjusting the aeration agent flow rate the flow of granular material can be controlled.

To prevent stagnant zoens of granular material resting on the annular hollow body 5, the upper surface of the annular hollow body 5 can be provided with means for introducing fluidization agent in the form of a plurality of openings 17. During normal operation fluidization agent is supplied through conduit 18. Suitable fluidization agents are steam, nitrogen, or synthesis gas.

In an alternative embodiment of the invention the support conduit 13 is slidably arranged in bushing 19 connected to the wall of the discharge conduit 4 to allow displacement of the conical hollow body 9 relative to the annular body 5 to adjust the width of the passage 15.

The following example illustrates the ability of the device to control flow of granular material. In outlet 3 having a diameter of 1.0 m an annular hollow body 5 is arranged having a thickness of 0.1 m and having an opening with a smallest diameter of 0.2 m, wherein the angle between the inclined side wall 6 and the central longitudinal axis 20 of the device is 20 degrees. The inclined side wall 10 of the conical hollow body 9 is parallel to the inclined side wall 6, and the thickness of the passage 15 is 0.05 m. The fluidization and aeration agent used in this example was air. The resistance against aeration agent flowing through the means for introducing aeration agent 16, expressed as pressure drop across the means, is 10 kPa for an aeration agent flow rate of 0.006 kg/s, and 20 kPa for a flow rate of 0.012 kg/s. Moreover, the resistance against agent flowing through the means for introducing fluidization agent 17, expressed as pressure drop across the means, is 25 kPa for a fluidization agent flow rate of 0.12 kg/s.

The container is filled with granular material having diameters between 0.005 and 1.00 mm and a bulk density of 960 kg/m$^3$. Fluidization agent is introduced at a rate of 0.05 kg/s. The level of granular material in the container is maintained at 2 m above the annular hollow body 5.

Aeration agent is introduced in the passage 15 at a flow rate of 0.002 kg/s, and 17.6 kg/s of granular material having a bulk density of 870 kg/m$^3$ is passing into the discharge conduit 4. Thereupon the flow rate with which aeration agent is introduced in the passage 15 is changed to 0.012 kg/s, and 24.4 kg/s of granular material having a bulk density of 757 kg/m$^3$ is passing into the discharge conduit 4.

Figure 2:
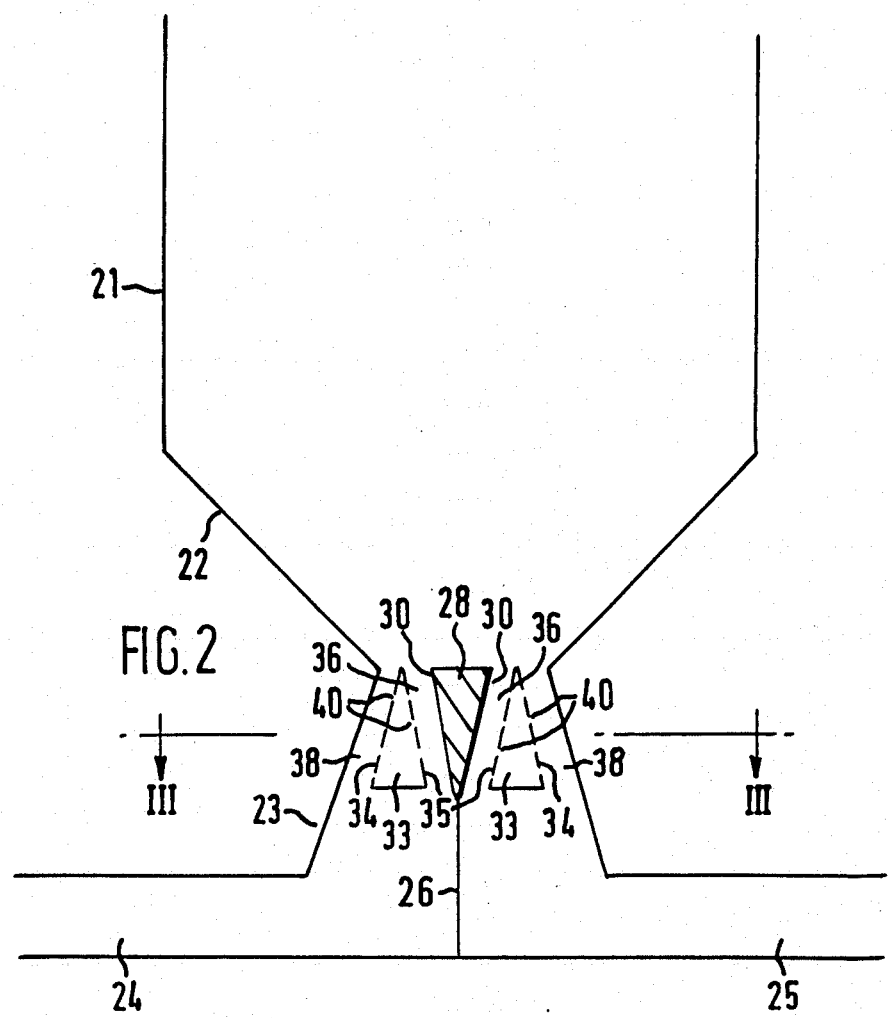
FIG. 2 shows schematically a second embodiment of the invention.
Figure 3:
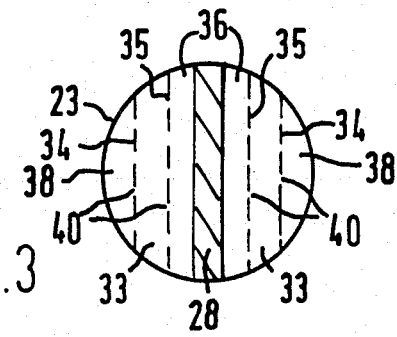
FIG. 3 shows a cross section of FIG. 2 along the line III—III.

Reference is made to FIGS. 2 and 3, showing the outlet of storage vessel 21 having a downwardly narrowing section 22 and a downwardly widening section 23 communicating with conduits 24 and 25, which conduits are separated by a separation wall 26. The device for controlling flow of granular material comprises a first member in the form of straight bar 28 having a triangular cross section and having inclined side walls 30, and second members in the form of straight hollow bars 33 having inclined side walls 34 and 35. The straight bar 28 is arranged on the separation wall 26, and the straight hollow bars 33 are arranged on supports (not shown) next to the straight bar 28 and next to the inclined wall of the downwardly widening section 23.

Between the adjacent inclined side walls 30 and 35 passages 36 are defined, and between the inclined wall of the downwardly widening section 23 and the inclined side walls 34 adjacent thereto passages 38 are formed.

The inclined side walls 34 and 35 of the straight hollow bars 33 are provided with means for introducing aeration agent in the passages 36 and 38 in the form of a plurality of openings 40. For the sake of clarity not all openings have been indicated with reference numerals.

During normal operation the container is filled with granular material, and aeration agent supplied to the straight hollow bars through a supply tube (not shown) is introduced in the passages 36 and 38 through the openings 40. The aeration agent will reduce the bulk density of material in the passages 36 and 38, and thus unobstructed flow of granular material through the passage is allowed.

Figure 4:
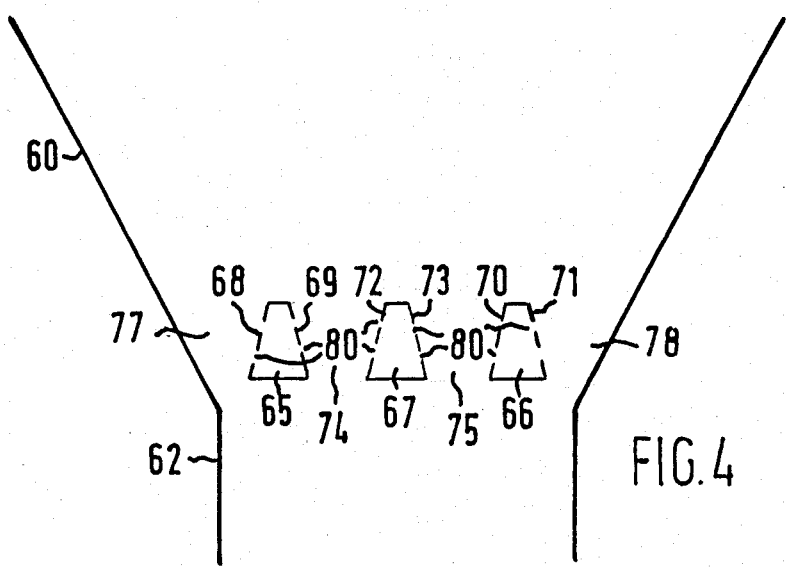
FIG. 4 shows schematically a third embodiment of the invention.

Reference is made to FIG. 4 showing a conical outlet 60 of a container having a large diameter, which outlet 60 communicates with a discharge conduit 62. The device for controlling the flow of granular material comprises first members in the form of bars 65 and 66, and a second member in the form of straight hollow bar 67 which is arranged next to the first members 65 and 66.

The first members have inclined side walls 68, 69, 70, and 71, and the second member has inclined side walls 72 and 73, wherein each inclined side wall of the second member is adjacent to an inclined side wall of a first member so that passages 74 and 75 are defined between the adjacent inclined side walls. In addition, passages 77 and 78 are formed between inclined side walls 68 and 71 and the inner side of the outlet 60.

The inclined side walls 68, 69, 70, 72 and 73 of the first and second members are provided with means for introducing aeration agent in the passages 74, 75, 77 and 78 in the form of a plurality of openings 80.

For the sake of clarity not all openings 80 have been indicated with the reference numeral, and the supports of the first and second members and the supply conduits for supplying aeration agent to the means for introducing aeration agent in the passages are not shown.

During normal operation the container is filled with granular material, and the aeration agent supplied to the straight hollow bars through the supply conduits (not shown) is introduced in the passages 74, 75, 77 and 78 through the openings 80. The aeration agent will reduce the bulk density of material in the passages 74, 75, 77 and 78 and thus unobstructed flow of granular material through the passages is allowed.

The apparatus as described with reference to FIG. 4 can suitably be used in a bunker flow reactor, where the bed of granular material in the outlet 60 is not a fluidized bed. In the outlet 60 mass flow will occur, and the supply of aeration agent has a further advantage that even if the wall of the conical outlet 60 is flat no stagnant zones will be formed.

Figure 5:
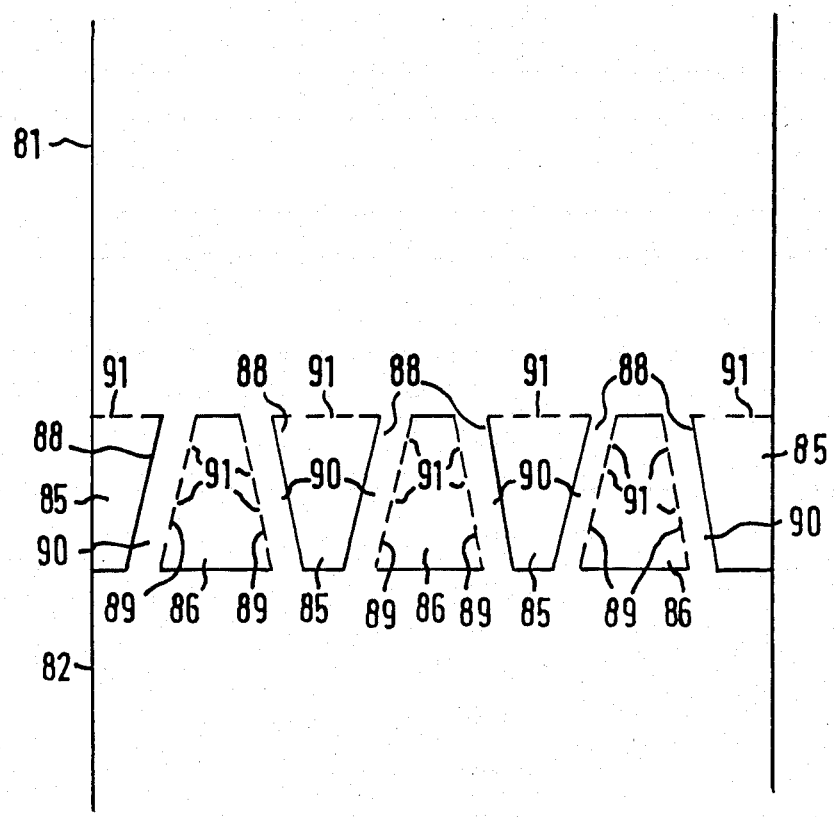
FIG. 5 shows schematically a fourth embodiment of the invention.

A suitable apparatus for controlling a flow of granular material out of a fluidized bed is shown in FIG. 5. The apparatus has an outlet 81 connected to the fluidized bed zone of a container having a large diameter, which outlet 81 communicates with a discharge conduit 82. The device for controlling the flow of granular material comprises first members in the form of straight hollow bars 85, and second members in the form of straight hollow bars 86 which are arranged next to the first members.

The first members have inclined side walls 88, and the second members have inclined side walls 89, wherein each inclined side wall of a second member is adjacent to an inclined side wall of a first member so that passages 90 are defined between the adjacent inclined side walls.

The inclined side walls 89 of the second members are provided with means for introducing aeration agent in the passages 98 in the form of a plurality of openings 91, and the upper sides of the first members 85 are provided with means for introducing fluidization agent in the outlet 81 in the form of openings 91.

For the sake of clarity not all openings 90 and 91 have been indicated with a reference numeral, and, in addition, the supports of the first and second members and the supply conduits for supplying aeration agent to the means for introducing aeration agent in the passages and for supplying fluidization agent are not shown.

During normal operation the container is filled with granular material, and aeration agent, supplied to the straight hollow bars through the supply conduits (not shown), is introduced in the passages 89 through the openings 90. To prevent stagnant zones fluidization agent is supplied to the openings 91. The aeration agent will reduce the bulk density of material in the passages 89 and thus unobstructed flow of granular material through the passages is allowed.

The sharp angle between inclined side walls and the central longitudinal axis of the device may be selected between 15 degrees and 60 degrees.

The means for introducing aeration agent into the passages may comprise any suitable material, for example porous brick or sinter metal plate.

What is claimed is:

1. An apparatus for controlling flow of a granular material comprising a first member having an inclined wall which forms a conical opening, and a second member having a conical outer wall arranged in the conical opening next to the first member, wherein the conical outer wall of the second member is adjacent and substantially parallel to the inclined wall of the conical opening of the first member so that a passage is defined between the adjacent inclined walls of the first and second members, wherein an upper surface of the first member which is substantially horizontal and the conical outer wall of the second member are provided with separate means for introducing aeration agent into the granular material; and wherein the second member is displaceable relative to the first member to change the size of the passage therebetween.

* * * * *